United States Patent
Furuichi et al.

(10) Patent No.: US 8,738,193 B2
(45) Date of Patent: May 27, 2014

(54) DEMAND CONTROL DEVICE, DEMAND CONTROL SYSTEM, AND DEMAND CONTROL PROGRAM

(75) Inventors: Munekazu Furuichi, Sakai (JP); Ryouji Inoue, Sakai (JP); Tomokazu Kishimoto, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 320 days.

(21) Appl. No.: 13/143,108

(22) PCT Filed: Jan. 26, 2010

(86) PCT No.: PCT/JP2010/050951
§ 371 (c)(1),
(2), (4) Date: Jul. 1, 2011

(87) PCT Pub. No.: WO2010/084986
PCT Pub. Date: Jul. 29, 2010

(65) Prior Publication Data
US 2011/0270460 A1    Nov. 3, 2011

(30) Foreign Application Priority Data
Jan. 26, 2009  (JP) ................................. 2009-014239

(51) Int. Cl.
| | |
|---|---|
| *G05D 3/12* | (2006.01) |
| *G05D 5/00* | (2006.01) |
| *G05D 9/00* | (2006.01) |
| *G05D 11/00* | (2006.01) |
| *G05D 17/00* | (2006.01) |

(52) U.S. Cl.
USPC .......................................... 700/295; 700/291

(58) Field of Classification Search
USPC ................................................. 700/291, 295
See application file for complete search history.

(56) References Cited

U.S. PATENT DOCUMENTS

| | | | | |
|---|---|---|---|---|
| 4,136,393 | A * | 1/1979 | Fox | 700/291 |
| 5,481,140 | A * | 1/1996 | Maruyama et al. | 307/11 |
| 8,474,279 | B2 * | 7/2013 | Besore et al. | 62/157 |
| 8,618,452 | B2 * | 12/2013 | Besore et al. | 219/702 |
| 2005/0096797 | A1 * | 5/2005 | Matsubara et al. | 700/291 |
| 2011/0137482 | A1 * | 6/2011 | Toba et al. | 700/291 |
| 2011/0148199 | A1 * | 6/2011 | Besore et al. | 307/41 |
| 2013/0103222 | A1 * | 4/2013 | Watson et al. | 700/295 |

FOREIGN PATENT DOCUMENTS

| | | |
|---|---|---|
| JP | 10-30834 A | 2/1998 |
| JP | 11-287496 A | 10/1999 |
| JP | 2001-119857 A | 4/2001 |
| JP | 2002-10532 A | 1/2002 |
| JP | 2004-363661 A | 12/2004 |

* cited by examiner

*Primary Examiner* — Mohammad Ali
*Assistant Examiner* — Ziaul Karim
(74) *Attorney, Agent, or Firm* — Birch, Stewart, Kolasch & Birch, LLP

(57) ABSTRACT

For each of the electric apparatuses belonging to an electric apparatus combination that was created by an apparatus calculation unit according to a target power-saving amount, a demand control information creation unit creates demand control information including a predetermined power corresponding to the target power-saving amount and a predetermined time of operating at this power. A demand request creation unit creates a demand request which is a signal which requests operation based on the demand control information for the apparatuses in the combination. When the predetermined time elapses, the apparatus calculation unit selects at least one or more apparatuses other than the apparatuses which are currently selected and additionally creates a new combination that is different from the current combination according to predetermined rules, and a communication unit sends the demand control information to the apparatus selected by the apparatus calculation unit.

6 Claims, 10 Drawing Sheets

FIG.3A

DEMAND REQUEST

| DATA NAME | DATA RANGE |
|---|---|
| MODEL NAME | CHARACTER STRING |
| SERIAL NUMBER | CHARACTER STRING |
| IP ADDRESS | 192.168.0.1~192.168.255.255 |
| OPERATING POWER TARGET VALUE | 0~4294967296 (W) |
| DEMAND CONTROL TIME | 60 (seconds) |

FIG.3B

DEMAND REQUEST RESPONSE

| DATA NAME | DATA RANGE |
|---|---|
| MODEL NAME | CHARACTER STRING |
| SERIAL NUMBER | CHARACTER STRING |
| IP ADDRESS | 192.168.0.1~192.168.255.255 |
| ERROR CODE | 0: NORMAL<br>OTHER THAN 0: ERROR |

FIG.8A

DEMAND RESULT NOTICE

| DATA NAME | DATA RANGE |
|---|---|
| MODEL NAME | CHARACTER STRING |
| SERIAL NUMBER | CHARACTER STRING |
| IP ADDRESS | 192.168.0.1～192.168.255.255 |
| ACTUAL OPERATING POWER VALUE (BEFORE DEMAND CONTROL) | 0～4294967296(W) |
| ACTUAL OPERATING POWER VALUE (UNDER DEMAND CONTROL) | 0～4294967296(W) |

FIG.8B

DEMAND RESULT NOTICE RESPONSE

| DATA NAME | DATA RANGE |
|---|---|
| MODEL NAME | CHARACTER STRING |
| SERIAL NUMBER | CHARACTER STRING |
| IP ADDRESS | 192.168.0.1～192.168.255.255 |
| ERROR CODE | 0: NORMAL<br>OTHER THAN 0: ERROR |

# DEMAND CONTROL DEVICE, DEMAND CONTROL SYSTEM, AND DEMAND CONTROL PROGRAM

TECHNICAL FIELD

The present invention relates to demand control technology of controlling the total power consumption of a plurality of electric apparatuses so that the power consumption will not exceed the upper limit value of the power supply.

BACKGROUND ART

If the power demand exceeds the power supplying capability, the circuit breaker is thrown in a limited power system such as in homes and buildings, and the power system will lose power. If an apparatus that requires continuous operation such as a medical apparatus is connected to the power system, the occurrence of a blackout is fatal. Moreover, in the case of an overall regional transmission grid, if the power demand exceeds the power supplying capability, for example, during severe heat in the summer, there is a possibility that a blackout will occur since the supply of power may fall short and cause considerable damage.

In order to avoid this kind of problem, known is a demand control technology of selecting one or more electric apparatuses among a plurality of electric apparatuses and controlling such electric apparatuses to be in a power-saving operation state in order to prevent the total power consumption of the plurality of electric apparatuses connected to a network from exceeding the upper limit value of the power supply. For example, known is a control device which targets air conditioners that consume large amounts of power and controls such air conditioners, in order from the lowest priority; for instance, from an air conditioner of an air-conditioned room with few people, to the power-saving operation state (refer to Patent Document 1). Also known is a demand control system which expanded the demand control target to home appliances other than air conditioners (refer to Patent Document 2).

In the demand control described in Patent Document 1 or Patent Document 2, the power-saving operation state of an apparatus of low priority is continued, and the user of such apparatus in the power-saving operation state is inconvenienced for a long time.

Patent Document 1: Japanese Patent Application Laid-open No. H10-30834
Patent Document 2: Japanese Patent Application Laid-open No. 2004-363661

SUMMARY OF THE INVENTION

The present invention was devised in view of the foregoing problems of a conventional demand control. Thus, an object of this invention is to provide a demand control device, a demand control system, and a demand control program capable of preventing inconvenience to users for a long time during demand control.

The demand control device according to one aspect of the present invention has:
a communication unit (110) for sending and receiving predetermined signals to and from a plurality of electric apparatuses ($A_1$ to $A_n$);
a total power consumption measurement unit (120) for measuring a total power consumption of the plurality of electric apparatuses ($A_1$ to $A_n$);
a target power-saving amount calculation unit (101) for calculating a target power-saving amount which is an excess amount of the total power consumption from a predetermined target power;
an apparatus calculation unit (102) for extracting one or more electric apparatuses from all of the electric apparatuses ($A_1$ to $A_n$) and creating a combination of the electric apparatuses according to the target power-saving amount;
a demand control information creation unit (103) for creating demand control information for the respective electric apparatuses belonging to the combination, the demand control information including at least a predetermined power corresponding to the target power-saving amount and a predetermined time of operating, based on this power, the respective electric apparatuses belonging to the combination; and
a demand request creation unit (104) for creating a demand request which is a signal requesting operation based on the demand control information for each of the one or more apparatuses extracted by the apparatus calculation unit,
wherein, when the predetermined time elapses, the apparatus calculation unit (102) extracts at least one or more apparatuses other than the apparatuses which are currently extracted and additionally creates a new combination that is different from the current combination according to predetermined rules, and
wherein the communication unit (110) sends the demand request to the apparatus extracted by the apparatus calculation unit (102).

The demand control program according to another aspect of the present invention causes a computer to execute:
a first step of measuring a total power consumption of a plurality of electric apparatuses;
a second step of calculating a target power-saving amount which is an excess amount of the total power consumption from a predetermined target power;
a third step of extracting one or more electric apparatuses from all of the electric apparatuses and creating a combination of the electric apparatuses according to the target power-saving amount;
a fourth step of creating demand control information for the respective electric apparatuses belonging to the combination, the demand control information including at least a predetermined power corresponding to the target power-saving amount and a predetermined time of operating, based on this power, the respective electric apparatuses belonging to the combination;
a fifth step of creating a demand request which is a signal which requests operation of each of the one or more apparatuses extracted in the fourth step based on the demand control information;
a sixth step of sending the demand request to the apparatus extracted in the third step; and
a seventh step of extracting at least one or more apparatuses other than the apparatuses which are currently extracted and additionally creating a new combination that is different from the current combination according to predetermined rules when the predetermined time elapses.

BRIEF DESCRIPTION OF THE DRAWINGS

FIG. 3(A) is a tabular diagram showing an example of the data structure of the demand request, and FIG. 3(B) is a tabular diagram showing an example of the data structure of the demand request response.

FIG. 8(A) is a tabular diagram showing an example of the data structure of the demand result notice, and FIG. 8(B) is a tabular diagram showing an example of the data structure of the demand result notice response.

DETAILED DESCRIPTION OF THE EMBODIMENTS OF THE INVENTION

Embodiment 1

Figure 1:
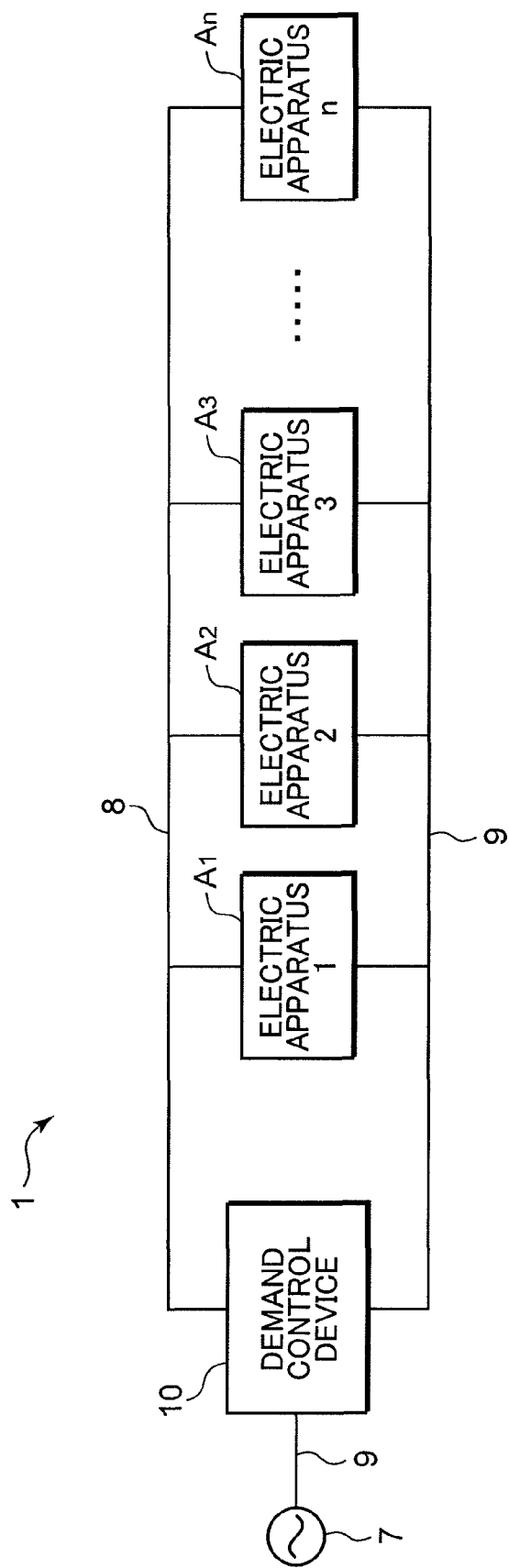
FIG. 1 is a schematic diagram showing the outline of the demand control system according to embodiment 1 of the present invention.

FIG. 1 is a schematic diagram showing the outline of the demand control system 1 according to embodiment 1 of the present invention. The demand control system 1 configures a network by n (n is an integer of 2 or higher) number of electric apparatuses $A_1$ to $A_n$ being connected, via a signal line 8, with the demand control device 10 for executing the demand control of the electric apparatuses $A_1$ to $A_n$. Here, the term "demand control" refers to the demand control device 10 selecting one or more electric apparatuses, and causing the selected electric apparatus to operate for a predetermined time (demand control time) at a predetermined power (operating power target value) according to an excess amount of the total power consumption of the electric apparatuses $A_1$ to $A_n$ relative to the predetermined target power.

The demand control system 1 is supplied with power from a power source 7 such as a commercial power source or a private electric generator via a power line 9. An apparatus control device 20 is built into at least certain electric apparatuses $A_1$ to $A_n$, thereby enabling the demand control by the demand control device 10.

Figure 2:
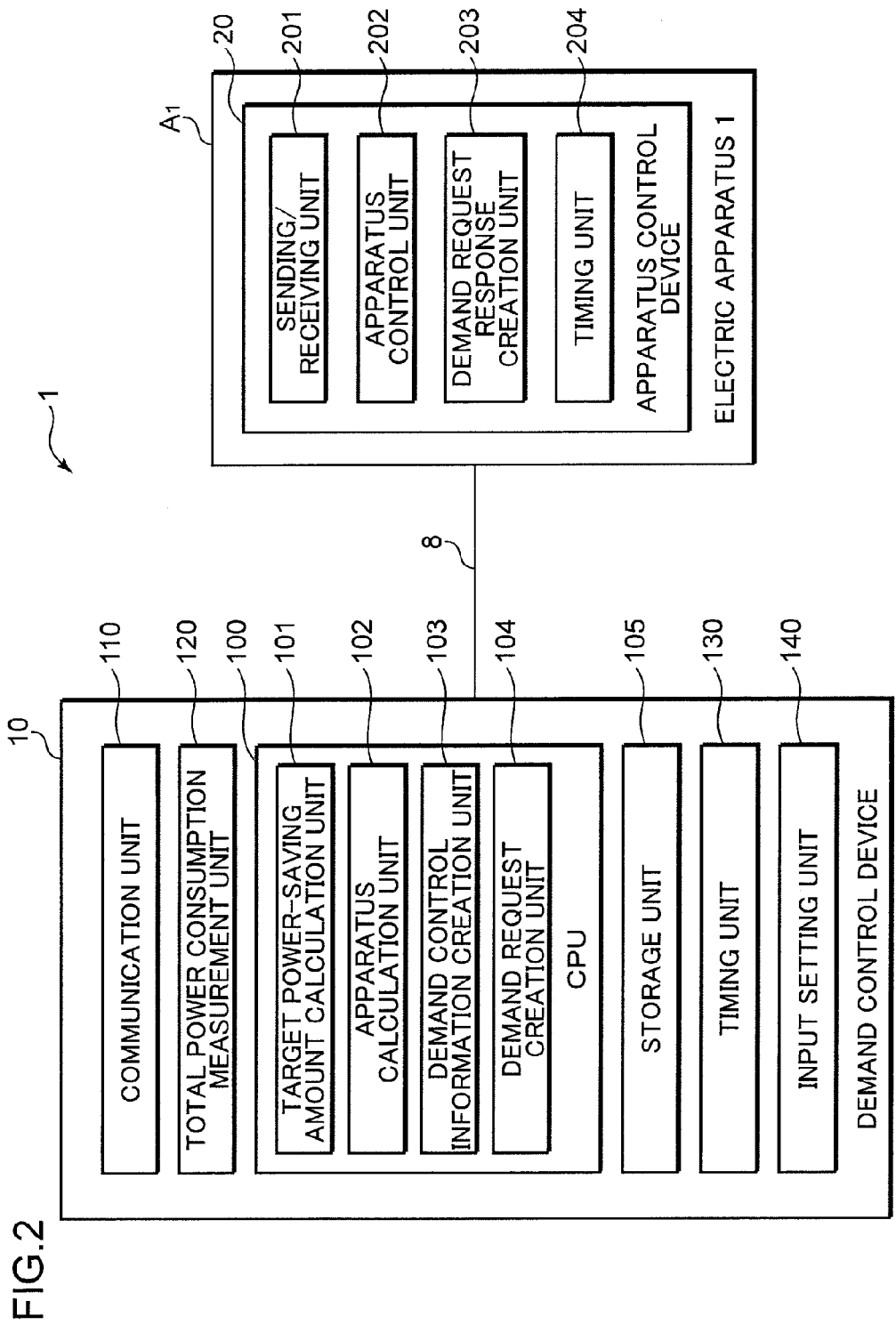
FIG. 2 is a block diagram showing the functional configuration of the demand control device and the apparatus control device built into the respective electric apparatuses according to embodiment 1.

FIG. 2 is a block diagram showing the functional configuration of the demand control device 10 and the apparatus control device 20 built into the respective electric apparatuses. In FIG. 2, only one electric apparatus is shown and the illustration of the power line 9 is omitted.

The demand control device 10 comprises a CPU (Central Processing Unit) 100, a storage unit 105, a communication unit 110, a total power consumption measurement unit 120, a timing unit 130, and an input setting unit 140. The apparatus control device 20 comprises a sending/receiving unit 201, an apparatus control unit 202, a demand request response creation unit 203, and a timing unit 204.

The CPU 100 functions as a software-based target power-saving amount calculation unit 101, an apparatus calculation unit 102, a demand control information creation unit 103, and a demand request creation unit 104 by executing the demand control programs which are stored in advance in the storage unit 105. Note that the target power-saving amount calculation unit 101, the apparatus calculation unit 102, the demand control information creation unit 103, and the demand request creation unit 104 can also be respectively provided within the CPU as hardware.

The total power consumption measurement unit 120 is, for example, a power meter, and measures the total power consumption of n-number of electric apparatuses $A_1$ to $A_n$ connected to the demand control system 1.

The input setting unit 140 comprises an input interface for the user to input the target power, apparatus list, operating power target value, maximum power consumption of the respective electric apparatuses, and demand control time, and sets the input value that was input by the user as the target power and other set values.

The target power is the power value that is set by the user as the target value of the total power consumption of the electric apparatuses $A_1$ to $A_n$. For example, the user sets the power value of approximately 90% of the upper limit value of the power supplying capability of the power source 7 as the target power. The difference between the actual total power consumption of the electric apparatuses $A_1$ to $A_n$ and the target power becomes the target power-saving amount as the electric energy is reduced as a result of the demand control device 10 executing the demand control of the electric apparatus in the overall demand control system 1.

As a result of the user inputting a value that is lower than the upper limit value of the power supplying capability of the power source 7 as the target power into the input setting unit 140, and the input setting unit 140 setting that input value as the target power, the difference between the upper limit value and the target power will become a buffer. Thus, even in cases where the total power consumption increases drastically, the demand control device 10 can execute the demand control of the electric apparatuses so that the total power consumption will not exceed the upper limit value.

Moreover, since the user can input the target power from the input setting unit 140, the user can set an arbitrary power value as the target power according to the power demand that changes based on season or addition of electric apparatuses.

The apparatus list is a database registering the electric apparatuses to be subject to the demand control among the electric apparatuses $A_1$ to $A_n$; that is, the electric apparatuses with the apparatus control device 20 built therein. For example, upon adding an electric apparatus to the demand control system 1 or removing an electric apparatus from the demand control system 1, the user can update the apparatus list by inputting the added or removed apparatus into the input setting unit 140. Since only the electric apparatuses registered in the apparatus list among the n-number of electric apparatuses will be controlled by the demand control device 10 as a result of the user registering the apparatus list, it is possible to selectively execute the demand control of the apparatus to be subject to demand control.

The operating power target value is the target value of the operating power of the respective electric apparatuses corresponding to the target power-saving amount. Since the power supplying capability of the power source 7 will approach its limit as the target power-saving amount increases, it is necessary to reduce the operating power target value in order to reduce the total power consumption. Specifically, the user will input the operating power target value as a value that is like an inverse proportion to the target power-saving amount. The difference between the maximum power consumption and the operating target power value becomes the power-saving amount of the respective electric apparatuses during the demand control (hereinafter referred to as the "demand control power-saving amount"). Note that the operating power target value can also be calculated by the CPU 100 from the maximum power consumption based on the target power-saving amount.

The demand control time is the time that the respective electric apparatuses are operated at the operating power target value; that is, the time that the power-saving operation is performed for the demand control power-saving amount. The user inputs a time of a level where such user will not feel any discomfort even if the respective electric apparatuses are being subject to demand control; for instance, 60 seconds, as the demand control time.

The target power-saving amount calculation unit 101 compares the total power consumption of the electric apparatuses $A_1$ to $A_n$ measured by the total power consumption measurement unit 120, and the target power that was input into the input setting unit 140 by the user, and thereby calculates the excess amount of the total power consumption from the target power as the target power-saving amount.

The storage unit 105 stores the demand control programs, as well as stores the target power, apparatus list, operating power target value, maximum power consumption of the respective electric apparatuses, and demand control time that were input into the input setting unit 140 by the user, and the target power-saving amount calculated by the target power-saving amount calculation unit 101.

The apparatus calculation unit 102 extracts one or more electric apparatuses among the electric apparatus that are registered in the apparatus list and creates a combination of the electric apparatus to be subject to demand control according to the target power-saving amount (apparatus calculation). Specifically, the apparatus calculation unit 102 calculates the demand control power-saving amount of the respective electric apparatuses from the maximum power consumption and the operating power target value of each of the extracted electric apparatuses, and creates the combination so that the total value of the demand control power-saving amount becomes equal to or greater than the target power-saving amount. For example, the apparatus calculation can be performed by the apparatus calculation unit 102 increasing, one by one, the number of electric apparatuses that are extracted among the electric apparatuses registered in the apparatus list until the total value of the demand control power-saving amount of the extracted electric apparatuses becomes equal to or greater than the target power-saving amount. Since the demand control power-saving amount of the respective apparatuses will not exceed the maximum power consumption of the apparatuses, the number of electric apparatuses that are extracted by the apparatus calculation unit 102 will increase as the target power-saving amount increases.

In addition, the apparatus calculation unit 102 extracts at least one or more apparatuses other than the apparatuses which are currently being extracted in order from the longest elapsed time from the time of sending the most recent demand request and additionally creates a new combination that is different from the current combination when the predetermined time elapses.

The demand control information creation unit 103 creates the demand control information including the operating power target value and the demand control time regarding the respective electric apparatuses belonging to the combination.

The demand request creation unit 104 creates a demand request as a signal which requests operation of the respective apparatuses belonging to the combination based on the demand control information.

FIG. 3(A) is a tabular diagram showing an example of the data structure of the demand request. The demand request includes, in addition to the operating power target value and the demand control time (60 seconds in this example), model name of the electric apparatus, serial number of the electric apparatus, and IP address uniquely assigned to the respective electric apparatuses. Note that the serial number of the electric apparatus is included in the demand request in consideration of the possibility that the power consumption during operation may differ depending on the individual differences even with the same models.

The communication unit 110 sends and receives predetermined signals to and from the sending/receiving unit 201 of the apparatus control device 20. Specifically, the communication unit 110 sends a demand request to the sending/receiving unit 201 and receives a demand request response, which is a response to the demand request. When the demand request creation unit 104 creates the demand request, the communication unit 110 sends the demand request to the sending/receiving unit 201 of the apparatus control device 20 provided in the apparatuses belonging to the combination.

The timing unit 130 comprises a clock oscillator for generating a clock signal at a constant frequency, and outputs the clock signal to the apparatus calculation unit 102. The apparatus calculation unit 102 determines whether the demand control time has elapsed based on the clock signal.

The sending/receiving unit 201 sends and receives predetermined signals to and from the communication unit 110 of the demand control device 10. For example, the sending/receiving unit 201 receives a demand request sent from the communication unit 110 and sends a demand request response, which is a response to the demand request.

The apparatus control unit 202 subjects the electric apparatus $A_1$ to power-saving operation for the demand control time and at the operating power target value indicated in the demand request when the sending/receiving unit 201 receives such demand request.

The demand request response creation unit 203 creates a demand request response as a response to the demand request when the sending/receiving unit 201 receives a demand request from the communication unit 110.

FIG. 3(B) is a tabular diagram showing an example of the data structure of the demand request response. The demand request response includes the model name of the electric apparatus $A_1$, the serial number of the electric apparatus $A_1$, the IP address uniquely assigned to the electric apparatus $A_1$, and an error code. The error code is a code for notifying the demand control device 10 of an error of the respective electric apparatuses, and the electric apparatus is normal if the value is 0, and a numerical value according to the type of error is set forth if the value is other than 0.

The timing unit 204 comprises a clock oscillator for generating a clock signal at a constant frequency, and outputs the clock signal to the apparatus control unit 202. The apparatus control unit 202 determines whether the demand control time has lapsed based on the clock signal.

Figure 4:
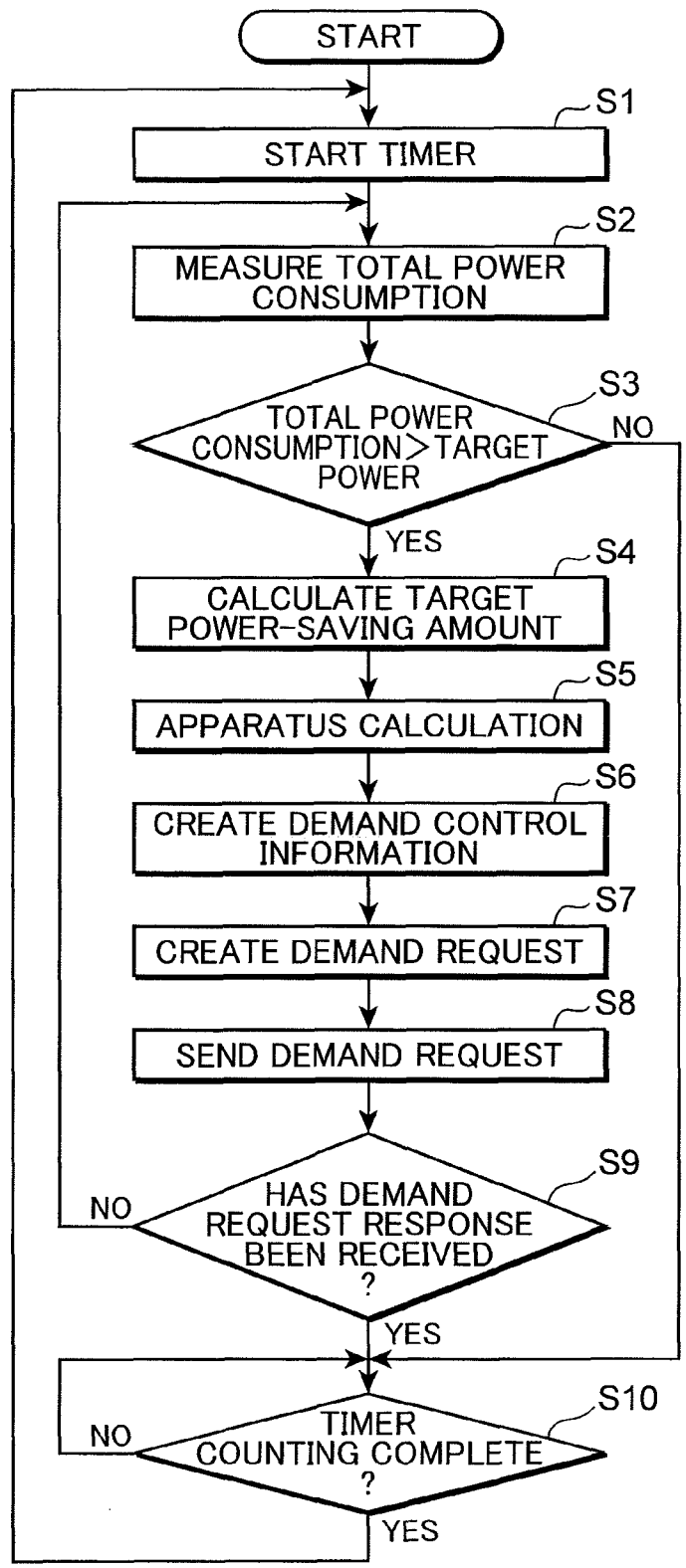
FIG. 4 is a flowchart showing the operation in the demand control of the demand control device according to embodiment 1.

FIG. 4 is a flowchart showing the operation of the demand control device 10 in the demand control. The apparatus calculation unit 102 starts the timer with the demand control time as the set time (step S1). The counting by the timer is performed based on the clock signal generated by the timing unit 130. When the timer is started, the total power consumption measurement unit 120 measures the total power consumption of the n-number of electric apparatuses $A_1$ to $A_n$ connected to the demand control system 1 (step S2). Subsequently, the target power-saving amount calculation unit 101 compares the total power consumption measured by the total power consumption measurement unit 120 and the target power, and, if the total power consumption exceeds the target power (YES in step S3), calculates the excess amount of the total power consumption from the target power as the target power-saving amount (step S4). If the total power consumption is less than the target power (NO in step S3), the routine proceeds to step S10.

The apparatus calculation unit 102 performs the apparatus calculation of extracting one or more electric apparatuses among the electric apparatuses registered in the apparatus list and calculating the demand control power-saving amount of the respective electric apparatuses from the maximum power consumption and the operating power target value of each of the extracted electric apparatuses, and creating a combination of the electric apparatuses so that the total value of the demand control power-saving amount becomes equal to or greater than the target power-saving amount (step S5). Subsequently, the demand control information creation unit 103 creates the demand control information including the demand control power-saving amount and the operating power target value regarding the respective electric apparatuses belonging to the combination (step S6). Subsequently, the demand request creation unit 104 creates a demand request as a signal which requests operation of each of the one or more apparatuses extracted by the apparatus calculation unit 102 based on the demand control information (step S7). Subsequently, the communication unit 110 sends the demand request to the sending/receiving unit 201 of the apparatus control device 20 (step S8).

When the communication unit 110 receives the demand request response sent from the sending/receiving unit 201 (YES in step S9), the target power-saving amount calculation unit 101 determines that the demand control of the electric apparatus has been started, and proceeds to step S10. When the communication unit 110 does not receive the demand request response (NO in step S9), the target power-saving amount calculation unit 101 determines that the demand control of the electric apparatus is not being performed, and returns to step S2. Until the counting by the timer is complete (NO in step S10), the demand control device 10 enters a standby state, and, when the counting of the timer is complete (YES in step S10), the routine returns to step S1 the timer is newly started.

Figure 5:
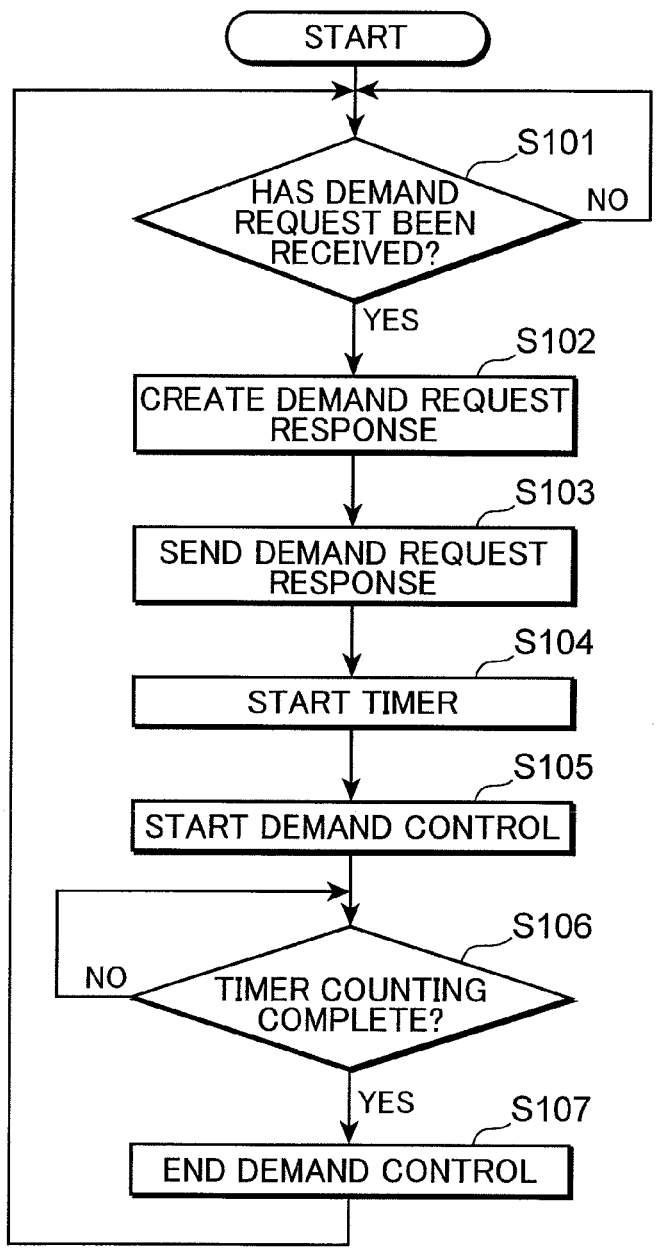
FIG. 5 is a flowchart showing the operation in the demand control of the apparatus control device according to embodiment 1.

FIG. 5 is a flowchart showing the operation of the apparatus control device 20 in the demand control. When the sending/receiving unit 201 receives the demand request from the communication unit 110 of the demand control device 10 (YES in step S101), the demand request response creation unit 203 creates a demand request response as the response to the demand request (step S102). Subsequently, the sending/receiving unit 201 sends the demand request response to the communication unit 110 (step S103).

Subsequently, the apparatus control unit 202 starts the timer with the demand control time as the set time based on the clock signal generated by the timing unit 204 (step S104), and starts the demand control by subjecting the electric apparatus $A_1$ to the power-saving operation for the demand control time and at the operating power target value indicated in the demand request (step S105). Until the counting by the timer is complete (NO in step S106), the apparatus control unit 202 continues the demand control, and, when the counting by the timer is complete (YES in step S106), the routine returns to step S1 and the apparatus control device 20 enters a standby state.

Figure 6:
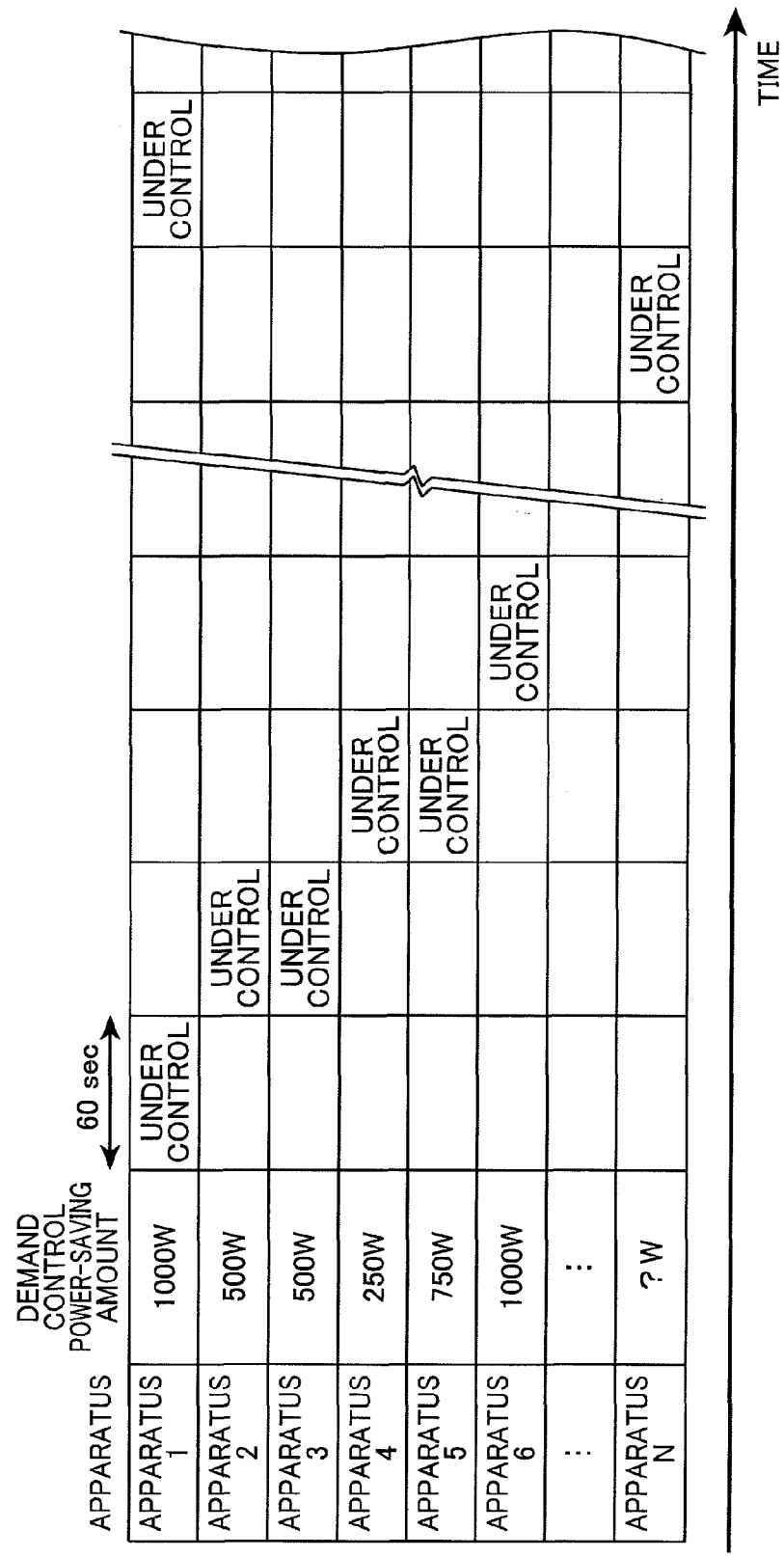
FIG. 6 is a diagram showing an example of the temporal change of the power-saving amount of the respective electric apparatuses for which the demand control is executed by the demand control device.

FIG. 6 is a diagram showing an example of the temporal change of the demand control power-saving amount of the respective electric apparatuses for which the demand control is executed by the demand control device 10 in the demand control system 1 connected to the n-number of electric apparatuses. In the example shown in FIG. 6, the demand control time is 60 seconds and the target power-saving amount is 1000 W, and the demand control power-saving amount of the respective electric apparatuses is 1000 W for the apparatus 1, 500 W for the apparatus 2, 500 W for the apparatus 3, 250 W for the apparatus 4, 750 W for the apparatus 5, and 1000 W for the apparatus 6. Note that, in the apparatus calculation, the order that the apparatus calculation unit 102 extracted the electric apparatuses and created the combination of the electric apparatuses is from apparatus 1 to apparatus N.

Since the demand control power-saving amount of the apparatus 1 is 1000 W, the electric apparatus to be initially extracted for ensuring the 1000 W as the target power-saving amount will suffice only with the apparatus 1. The apparatuses to be extracted as the subsequent combination after the demand control time of the apparatus 1 is complete are the apparatus 2 and the apparatus 3 in which the total demand control power-saving amount becomes 1000 W. The apparatuses to be extracted as the subsequent combination after the demand control time of the combination of the apparatus 2 and the apparatus 3 is complete are the apparatus 4 and the apparatus 5 in which the total demand control power-saving amount becomes 1000 W. The apparatus to be extracted subsequently after the demand control time of the combination of the apparatus 4 and the apparatus 5 is complete is only the apparatus 6 in which the demand control power-saving amount is 1000 W. The extraction of the apparatuses is repeated as described above, and, after making a full round up to the apparatus N, the apparatus calculation unit 102 extracts the apparatus 1 with the longest elapsed time from the sending of the most recent demand request, and subsequently extracts the apparatus 2 to the apparatus N in a similar manner.

As a result of the apparatus calculation unit 102 performing the apparatus calculation and the electric apparatuses 1 to N being sequentially subject to the power-saving operation as with the example shown in FIG. 6, it is possible to reduce the continuous power-saving operation of apparatuses of a specific combination. Accordingly, it is possible to prevent the inconvenience of users using apparatuses belonging to the specific combination. In addition, since the apparatus calculation unit 102 extracts the electric apparatuses in order from the longest elapsed time from the sending of the most recent demand request and creates the new combination, it is possible to avoid the demand control being concentrated on a specific electric apparatus.

Embodiment 2

The demand control system 2 according to embodiment 2 differs from embodiment 1 with respect to the point that the apparatus control device 20 of the demand control system 1 is replaced with an apparatus control device 21 comprising a power measurement unit 205 in addition to the configuration of the apparatus control device 20. This embodiment is now explained with reference to FIG. 7 to FIG. 10. Note that the explanation of the points that are different from embodiment 1 is omitted unless needed.

Figure 7:
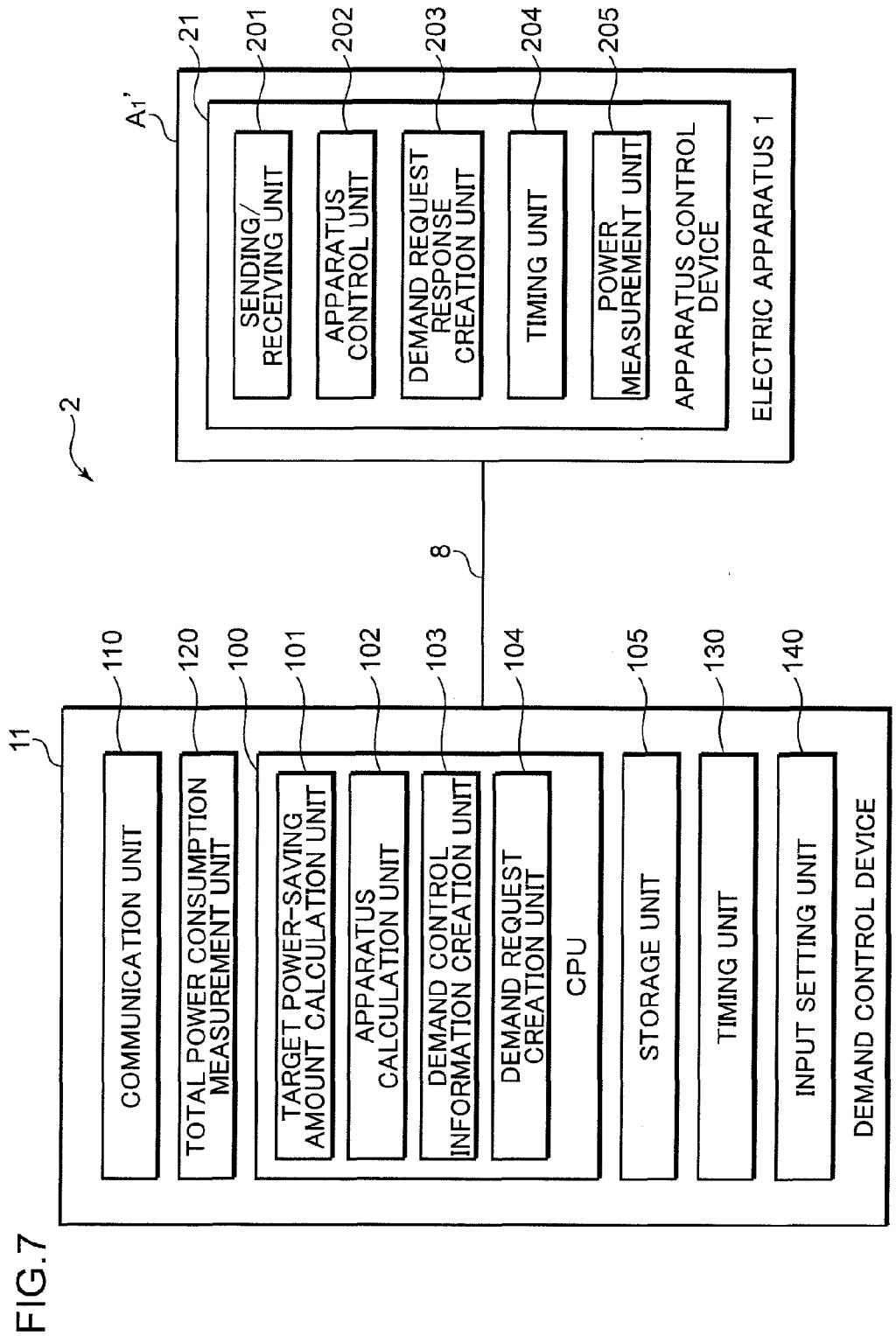
FIG. 7 is a functional block diagram showing the functional configuration of the demand control device and the apparatus control device built into the respective electric apparatuses according to embodiment 2.

FIG. 7 is a functional block diagram showing the functional configuration of the demand control device 11 and the apparatus control device 21 built into the respective electric apparatuses. In FIG. 7, as with FIG. 2, only one electric apparatus is shown and the illustration of the power line 9 is omitted. The apparatus control device 21 additionally comprises a power measurement unit 205 in addition to the configuration of the apparatus control device 20. The constituent elements of the demand control device 11 are the same as the demand control device 10 according to embodiment 1, but the operation in the demand control is partially different from the demand control device 10.

The power measurement unit 205 is, for example, a power meter, and measures the power consumption of the electric apparatus $A_1'$. The apparatus control unit 202 causes the sending/receiving unit 201 to send, to the communication unit 110 of the demand control device 11, a demand result notice as data including the power consumption value of the electric apparatus $A_1'$ before and after the start of the demand control as measured by the power measurement unit 205.

FIG. 8(A) is a tabular diagram showing an example of the data structure of the demand result notice. The demand result notice includes model name of the electric apparatus $A_1'$, serial number of the electric apparatus $A_1'$, IP address uniquely assigned to the electric apparatus $A_1'$, and the power consumption value of the electric apparatus $A_1'$ before and after the start of the demand control as measured by the power measurement unit 205.

When the communication unit 110 of the demand control device 11 receives the demand result notice, the target power-saving amount calculation unit 101 corrects the error between the target power-saving amount calculated before the demand request was sent and the actual power-saving amount, and newly calculates the target power-saving amount. In addition, the demand control device 11 creates a demand result notice response as the response to the demand result notice, and the communication unit 110 sends the demand result notice response to the sending/receiving unit 201 of the apparatus control device 21.

FIG. 8(B) is a tabular diagram showing an example of the data structure of the demand result notice response. The demand result notice response includes, as with the demand request response shown in FIG. 3(B), the model name of the electric apparatus, the serial number of the electric apparatus, the IP address uniquely assigned to the respective electric apparatuses, and an error code.

Figure 9:
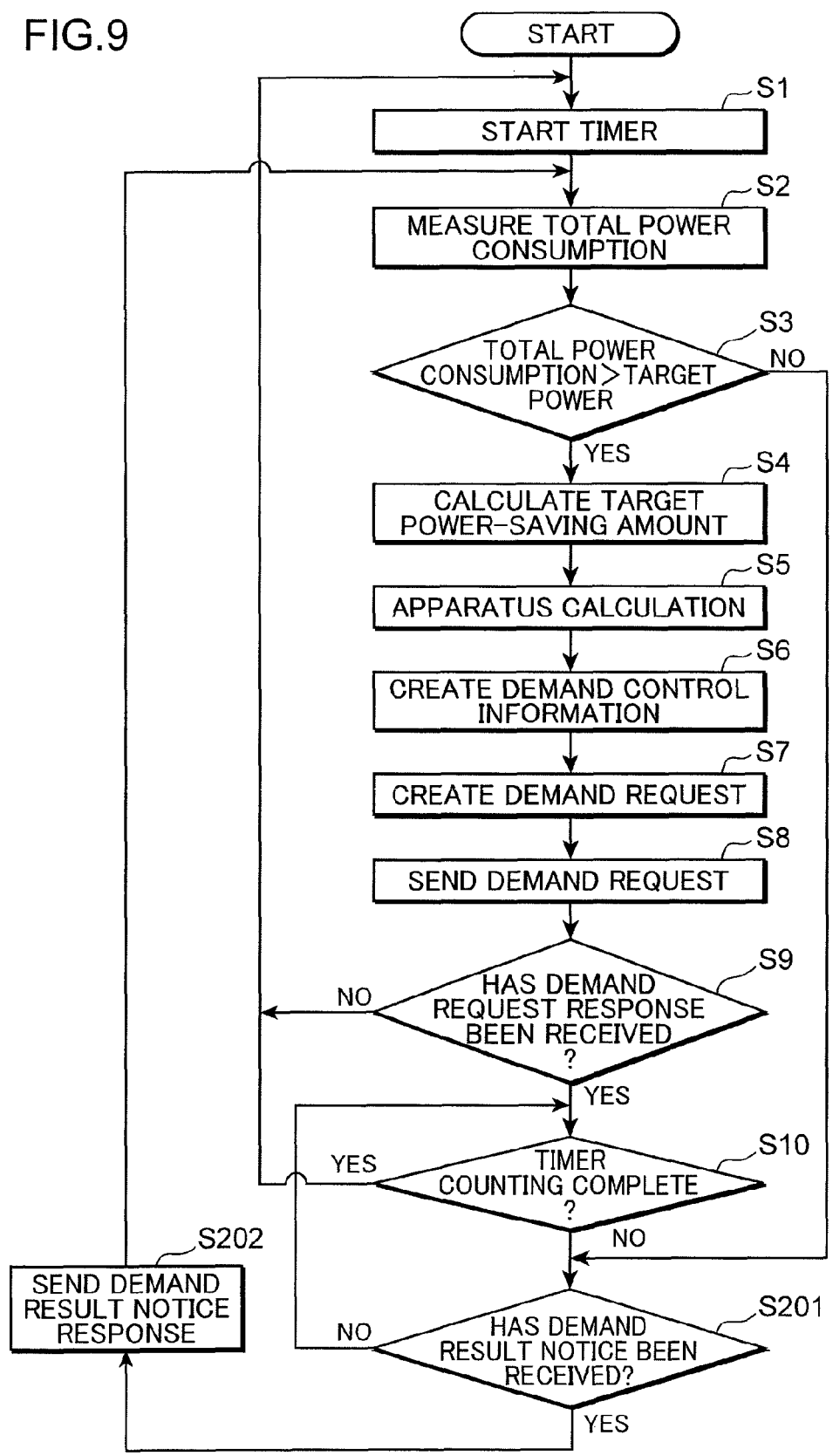
FIG. 9 is a flowchart showing the operation in the demand control of the demand control device according to embodiment 2.

FIG. 9 is a flowchart showing the operation in the demand control of the demand control device 11. Up to step S10, the operation is the same as the demand control device 10 in embodiment 1. While the counting by the timer is being performed (NO in step S10), when the communication unit 110 receives the demand result notice of the electric apparatus $A_1'$ from the sending/receiving unit 201 of the apparatus control device 20 (YES in step S201), the demand control device 11 creates a demand result notice response as the response to the demand result notice, and the communication unit 110 sends the demand result notice response to the sending/receiving unit 201 of the apparatus control device 21 (step S202). Subsequently, the routine returns to step S2 and processing up to step S9 is repeated. Specifically, the target power-saving amount calculation unit 101 corrects the error between the target power-saving amount calculated before the demand request was sent and the actual power-saving amount, and newly calculates the target power-saving amount. When the counting by the timer is complete (YES in step S10), the routine returns to step S1 and the timer is newly started.

Figure 10:
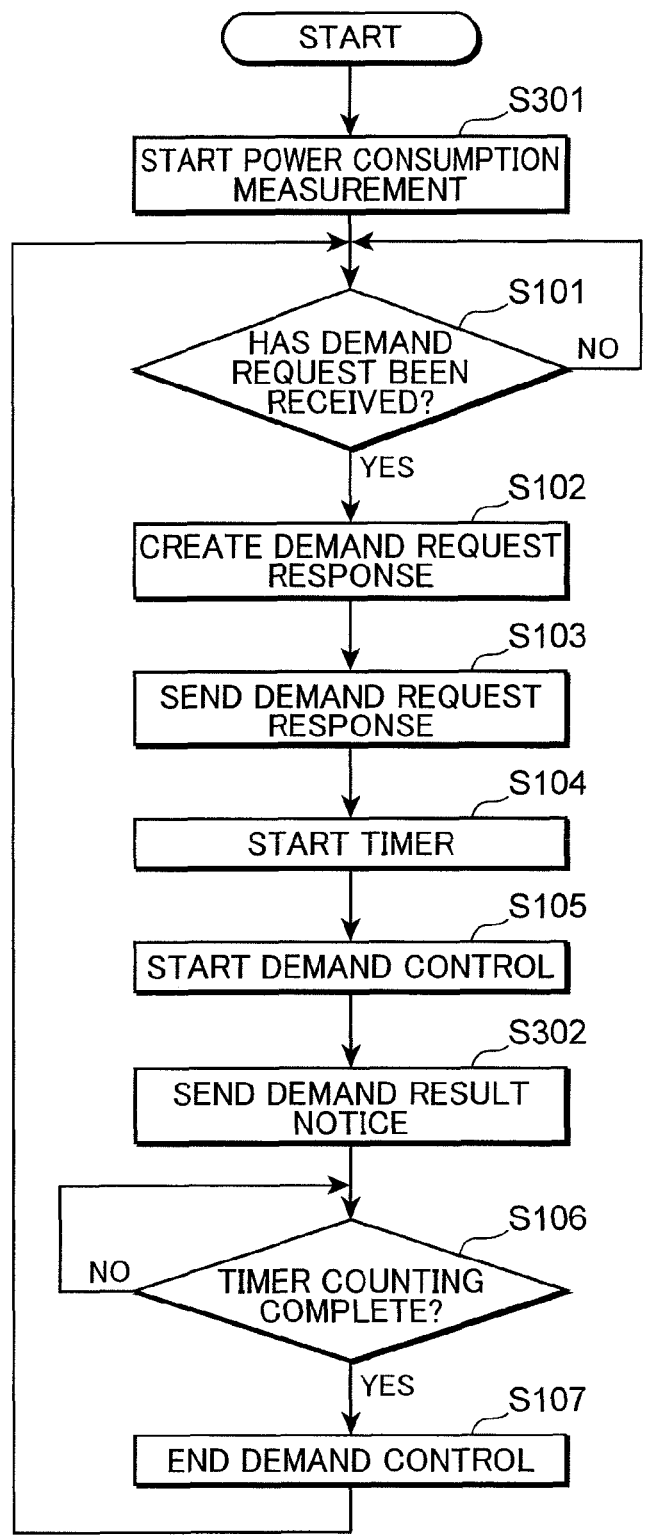
FIG. 10 is a flowchart showing the operation in the demand control of the apparatus control device according to embodiment 2.

FIG. 10 is a flowchart showing the operation in the demand control of the apparatus control device 21. When the electric apparatus $A_1'$ is started up, the power measurement unit 205 starts measuring the power consumption of the electric apparatus $A_1'$ (step S301). The operation from the reception of the demand request (step S101) to the start of the demand control (step S105) is the same as the apparatus control device 20 in embodiment 1. When the apparatus control unit 202 starts the demand control of the electric apparatus (step S105), the apparatus control unit 202 causes the sending/receiving unit 201 to send the demand result notice to the communication unit 110 of the demand control device 11 (step S302). Until the counting by the timer is complete (NO in step S106), the apparatus control unit 202 continues the demand control shown with the processing from S102 to S302, and, when the counting by the timer is complete (YES in step S106), the routine returning to step S101 is the same as embodiment 1.

According to the demand control system 2 of embodiment 2, since the target power-saving amount calculation unit 101 corrects the error between the target power-saving amount calculated before the demand request was sent and the actual power-saving amount, and newly calculates the target power-saving amount, the target power-saving amount can be calculated with higher accuracy. The other effects are the same as the demand control system 1 according to embodiment 1.

The demand control systems 1 and 2 according to embodiments 1 and 2 of the present invention were described above, but the present invention is not limited thereto, and may also adopt the following modified examples.

(1) In foregoing embodiments 1 and 2, the demand control time was the same for all electric apparatuses, but the demand control time can be a different value according to the type of apparatus.

(2) In foregoing embodiments 1 and 2, the apparatus calculation unit 102 extracts the electric apparatus in order from the longest elapsed time from the sending of the most recent demand request and creates the new combination. Alternatively, the apparatuses may be extracted randomly or the apparatuses may be extracted in the order of a list.

(3) In foregoing embodiments 1 and 2, the input setting unit 140 is provided so that users can input the target power value, but the target power value may also be set to a default value.

(4) In foregoing embodiments 1 and 2, the signal line 8 and the power line 9 are independent lines, but a single line can be concurrently used as the signal line and the power line by adopting PLC (Power Line Communication).

To summarize, the demand control device according to the present invention has: a communication unit for sending and receiving predetermined signals to and from a plurality of electric apparatuses; a total power consumption measurement unit for measuring a total power consumption of the plurality of electric apparatuses; a target power-saving amount calculation unit for calculating a target power-saving amount which is an excess amount of the total power consumption from a predetermined target power; an apparatus calculation unit for extracting one or more electric apparatuses from all of the electric apparatuses and creating a combination of the electric apparatuses according to the target power-saving amount; a demand control information creation unit for creating demand control information including at least a predetermined power corresponding to the target power-saving amount and a predetermined time of operating, based on this power, the respective electric apparatuses belonging to the combination; and a demand request creation unit for creating a demand request which is a signal requesting operation based on the demand control information for each of the one or more apparatuses extracted by the apparatus calculation unit, wherein, when the predetermined time elapses, the apparatus calculation unit extracts at least one or more apparatuses other than the apparatuses which are currently extracted and additionally creates a new combination that is different from the current combination according to predetermined rules, and wherein the communication unit sends the demand request to the apparatus extracted by the apparatus calculation unit.

Moreover, the demand control program according to the present invention causes a computer to execute: a first step of measuring a total power consumption of a plurality of electric apparatuses; a second step of calculating a target power-saving amount which is an excess amount of the total power consumption from a predetermined target power; a third step of extracting one or more electric apparatuses from all of the electric apparatuses and creating a combination of the electric apparatuses according to the target power-saving amount; a fourth step of creating demand control information including at least a predetermined power corresponding to the target power-saving amount and a predetermined time of operating, based on this power, the respective electric apparatuses belonging to the combination; a fifth step of creating a demand request which is a signal which requests operation based on the demand control information for each of the one or more apparatuses extracted in the fourth step; a sixth step of sending the demand request to the apparatus extracted in the third step; and a seventh step of extracting at least one or more apparatuses other than the apparatuses which are currently extracted and additionally creating a new combination that is different from the current combination according to predetermined rules when the predetermined time elapses.

According to the foregoing inventions, when the predetermined time elapses, since at least one or more apparatuses other than the apparatuses, which are currently being extracted, are extracted according to predetermined rules and a new combination that is different from the current combination is additionally created, and the electric apparatuses belonging to that combination are operated for a predetermined time at a predetermined power corresponding to the target power-saving amount, it is possible to reduce the continuous power-saving operation of apparatuses of a specific combination. Accordingly, it is possible to prevent the inconvenience of users using apparatuses belonging to the specific combination. Note that the term "demand control" as used herein shall mean the operation of an electric apparatus belonging to the combination for the foregoing predetermined time at the foregoing predetermined power corresponding to the target power-saving amount.

Moreover, according to the present invention, since the difference between the upper limit value and the target power will become a buffer by pre-setting a value that is lower than the upper limit value of the power supplying capability as the target power, even in cases where the total power consumption increases drastically, the electric apparatuses can be subject to demand control so that the total power consumption will not exceed the upper limit value.

Moreover, with the demand control system of the present invention, the apparatus calculation unit extracts the electric apparatuses in order from the longest elapsed time from the sending of the most recent demand request and creates the new combination.

According to this invention, since the apparatus calculation unit extracts the electric apparatuses in order from the longest elapsed time from the time of sending the most recent demand request and creates the new combination, it is possible to avoid the demand control being concentrated on a specific electric apparatus.

Moreover, the demand control system of the present invention further comprises an input setting unit for setting a power value that is input by a user as the target power.

According to this invention, the user can set an arbitrary power value as the target power according to the power demand that changes based on season or addition of electric apparatuses.

Moreover, the demand control system of the present invention further has a storage unit for storing an apparatus list which is a database registering electric apparatuses capable of executing the demand request among the plurality of electric apparatuses, and the apparatus calculation unit creates the combination from among the electric apparatuses registered in the apparatus list.

According to this invention, since the demand control information is created only with the electric apparatuses registered in the apparatus list as the control target among the plurality of electric apparatuses, it is possible to selectively executing the demand control of the apparatus to be subject to demand control.

Moreover, the demand control system of the present invention has any one of the demand control devices according to the present invention, and apparatus control devices which are built into each of the plurality of electric apparatuses, wherein each apparatus control device comprises a sending/receiving unit for sending and receiving predetermined signals to and from the demand control device, and an apparatus control unit for causing the electric apparatus to operate at the predetermined power when the sending/receiving unit receives the demand request.

Moreover, with the demand control system of the present invention, the apparatus control device further has a power measurement unit for measuring the power consumption of the electric apparatus having the apparatus control device built therein, the power measurement unit measures the power consumption of the electric apparatus before and after starting the drive thereof based on the demand control information, the sending/receiving unit sends to the communication unit a power value, before and after starting the drive, measured by the power measurement unit, and the target power-saving amount calculation unit newly calculates the target power-saving amount based on the power value before and after starting the drive sent from the sending/receiving unit in substitute for the target power-saving amount calculated before sending the demand request.

According to this invention, since the target power-saving amount calculation unit newly calculates the target power-saving amount based on the actual power consumption value of the respective apparatuses, for which demand control has been started, after the sending of the demand request in substitute for the target power-saving amount that was calculated before the demand request was sent, the target power-saving amount can be calculated with higher accuracy.

The invention claimed is:

1. A demand control device, comprising:
a communication unit for sending and receiving predetermined signals to and from a plurality of electric apparatuses;
a total power consumption measurement unit for measuring a total power consumption of the plurality of electric apparatuses;
a storage unit for storing a predetermined target power as a target value of the total power consumption, a maximum power consumption of each of the electric apparatuses, and a predetermined operating power target value for each of the electric apparatuses, the operating power target value being a target value for a demand control of controlling one or more electric apparatuses to be in a power-saving operation state;

a target power-saving amount calculation unit for calculating a target power-saving amount which is an excess amount of the total power consumption from the predetermined target power;

an apparatus calculation unit for calculating a demand control power-saving amount of each of the electric apparatuses, the demand control power-saving amount being a difference between the maximum power consumption and the operating power target value of the corresponding electric apparatus, selecting one or more electric apparatuses from all of the electric apparatuses to create a combination of the electric apparatuses so that a total value of the demand control power-saving amounts of the combination becomes equal to or greater than the target power-saving amount;

a demand control information creation unit for creating demand control information for the respective electric apparatuses belonging to the combination, the demand control information including at least the corresponding operating power target value and a predetermined time of operating at the corresponding operating power target value; and a demand request creation unit for creating a demand request which is a signal for requesting operation based on the demand control information for each of the one or more apparatuses selected by the apparatus calculation unit, wherein when the predetermined time elapses, the apparatus calculation unit selects at least one or more apparatuses other than the one or more apparatuses which are in the current combination to additionally create a new combination that is different from the current combination according to predetermined rules, and the communication unit sends the demand request to the electric apparatus selected by the apparatus calculation unit, and the apparatus calculation unit selects the one or more electric apparatuses in order from the longest elapsed time from the time of sending the most recent demand request and creates the new combination.

2. The demand control device according to claim 1, further comprising an input setting unit for setting a power value that is input by a user as the target power.

3. The demand control device according to claim 1, wherein the storage unit stores an apparatus list which is a database registering electric apparatuses capable of executing the demand request among the plurality of electric apparatuses, and the apparatus calculation unit creates the combination from among the electric apparatuses registered in the apparatus list.

4. A demand control system comprising: the demand control device according to claim 1; and apparatus control devices which are built into each of the plurality of electric apparatuses, wherein each apparatus control device comprises: a sending/receiving unit for sending and receiving predetermined signals to and from the demand control device; and an apparatus control unit for causing the electric apparatus to operate at the predetermined power when the sending/receiving unit receives the demand request.

5. The demand control system according to claim 4, wherein the apparatus control device further comprises a power measurement unit for measuring the power consumption of the electric apparatus having the apparatus control device built therein, the power measurement unit measures the power consumption of the electric apparatus before and after starting the drive thereof based on the demand control information, the sending/receiving unit sends to the communication unit a power value, before and after starting the drive, measured by the power measurement unit, and the target power-saving amount calculation unit newly calculates a target power-saving amount based on the power value before and after starting the drive sent from the sending/receiving unit in substitute for the target power-saving amount calculated before sending the demand request.

6. A non-transitory computer-readable medium which stores a demand control program which when executed causes a computer to perform a process comprising: measuring a total power consumption of a plurality of electric apparatuses; calculating a target power-saving amount which is an excess amount of the total power consumption from a predetermined target power as a target value of the total power consumption;

selecting one or more electric apparatuses from all of the electric apparatuses to create a combination of the electric apparatuses so that a total value of the demand control power-saving amounts of the combination becomes equal to or greater than the target power-saving amount, each demand control power-saving amount being a difference between a maximum power consumption and a predetermined operating power target value of the corresponding electric apparatus, the operating power target value being a target value for a demand control of controlling one or more electric apparatuses to be in a power-saving operation state;

creating demand control information for the respective electric apparatuses belonging to the combination, the demand control information including at least the corresponding operating power target value and a predetermined time of operating at the corresponding operating power target value;

creating a demand request which is a signal which requests operation based on the demand control information for each of the selected one or more apparatuses;

sending the demand request to the selected one or more apparatuses; and selecting at least one or more apparatuses other than the one or more apparatuses which are in the current combination to additionally create a new combination that is different from the current combination according to predetermined rules when the predetermined time elapses, and the apparatus calculation unit selects the one or more electric apparatuses in order from the longest elapsed time from the time of sending the most recent demand request and creates the new combination.

* * * * *